May 22, 1928.
A. R. WEAVER
HOSPITAL BED
Filed April 8, 1926
1,670,601
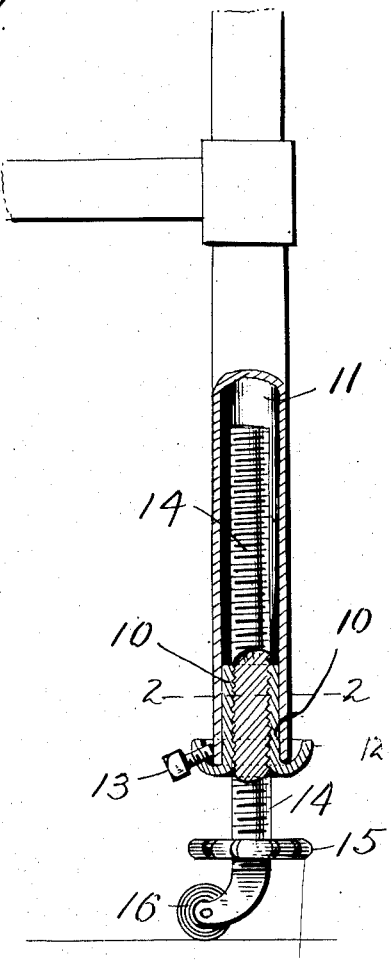
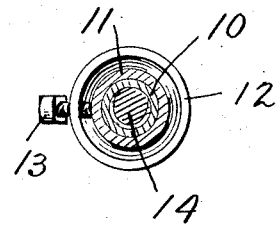
Inventor
Allen R. Weaver
By Chas. J. Williamson
Attorney Patented May 22, 1928.

1,670,601

UNITED STATES PATENT OFFICE.

ALLEN RAMSEY WEAVER, OF BATESVILLE, ARKANSAS.

HOSPITAL BED.

Application filed April 8, 1926. Serial No. 100,675.

It is essential or important with some surgical or other cases that it be possible to give some slant or inclination to the bed of the patient. Sometimes the head should be higher than the foot, and vice versa. I have observed in hospitals it to be the practice to use wooden blocks placed under the legs of the bed for the purpose stated, these blocks being about a foot high. Such a procedure is open to various and some serious objections. In the first place, it is a cumbersome or clumsy method, involving as it does, loose blocks of considerable size, which when not in use may be scattered around on the floor; the fixed size of the blocks limits to but one angle; it is dangerous because the blocks may be accidently kicked or knocked from under the leg, allowing the bed to fall with serious consequences; and if there is an occasion to move the bed the blocks must be first removed, and then replaced. The object of my invention is to provide a device which may be furnished with the bed as a part of the original installation, or which may be used as an attachment for beds not so equipped, which when applied to the bed will be a permanent part thereof, and which will overcome all of the objections just noted to the block device. My invention consists in whatever is described by or is included within the terms or scope of the appended claim.

In the drawings:

Fig. 1 is a view partly in side elevation and partly in section of a bed having its legs equipped with an embodiment of my invention;

Fig. 2 is a horizontal section on the line 2—2 of Fig. 1.

In making my invention I take advantage of the fact that invalid or hospital beds have legs that are sections of pipe or are tubular, and a device embodying my invention comprises a metal sleeve, 10, say of iron or steel, having an external diameter which snugly fits the interior of the tubular leg, 11, and at its lower end has an out-turned flange, 12, which engages the bottom of the leg to prevent its passing too far into the leg, and which flange affords a convenient means of using a set screw, 13, which binds against the leg on the outside, and thereby prevents accidental separation of the sleeve and leg. Said sleeve is of substantial length, say three or four inches long, so that it may have a good side bearing against the leg, and assure its being kept in a straight condition. Said sleeve has internal screw thread for engagement by external thread of a long screw, 14, preferably made about eighteen inches long, and the screw at its lower end has a handle, 15, which may be an annular enlargement or flange on the screw of sufficient diameter, and of such shape, that it may be readily grasped by the hand for revolving the screw to move it up or down on its threaded connection with the sleeve, and thus vary the extent of projection of its lower end on that leg. At its bottom the screw preferably has a caster 16, or other anti-friction bearing to contact with the floor. By reason of the substantial length of the internally threaded sleeve, it will be seen that the screw is rigidly supported against lateral movement, and therefore, the bed will be solidly supported by its legs. It, of course, is understood that one of my devices is applied to each of the four legs of the bed. When the bed is to be in a perfectly horizontal position, the screws being adjusted as far as they will go into the legs, the appearance of the bed will be no different from that of a bed with ordinary legs.

One of the important advantages of my invention compared with the block contrivance to which I have referred, is that it is impossible to lower the bed suddenly and violently the entire distance equal to the height of the blocks, but of necessity the lowering of the bed must be done gradually and gently, and therefore, with as much comfort to the patient as possible.

What I claim is:

A leg adjusting attachment for invalid or hospital beds comprising an internally threaded sleeve adapted to snugly fit the interior of a bed leg, a screw of substantial length engaging the threads in said sleeve, said sleeve having a cup-shape flange adapted to engage the bottom of said leg and a set screw passing through such flange and adapted to engage said leg to secure said sleeve to said leg.

In testimony whereof I hereunto affix my signature.

ALLEN R. WEAVER.